Patented Mar. 31, 1925.

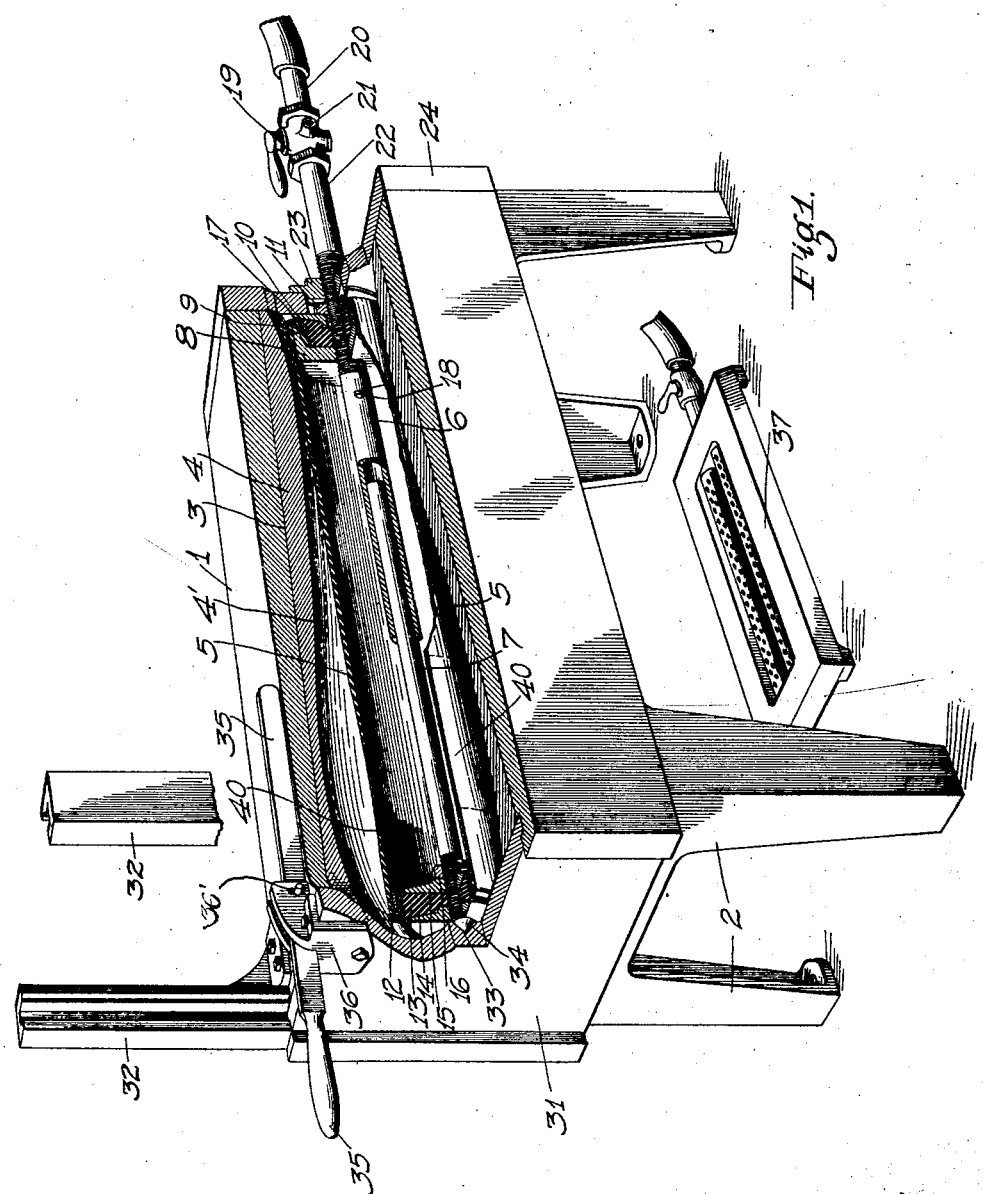

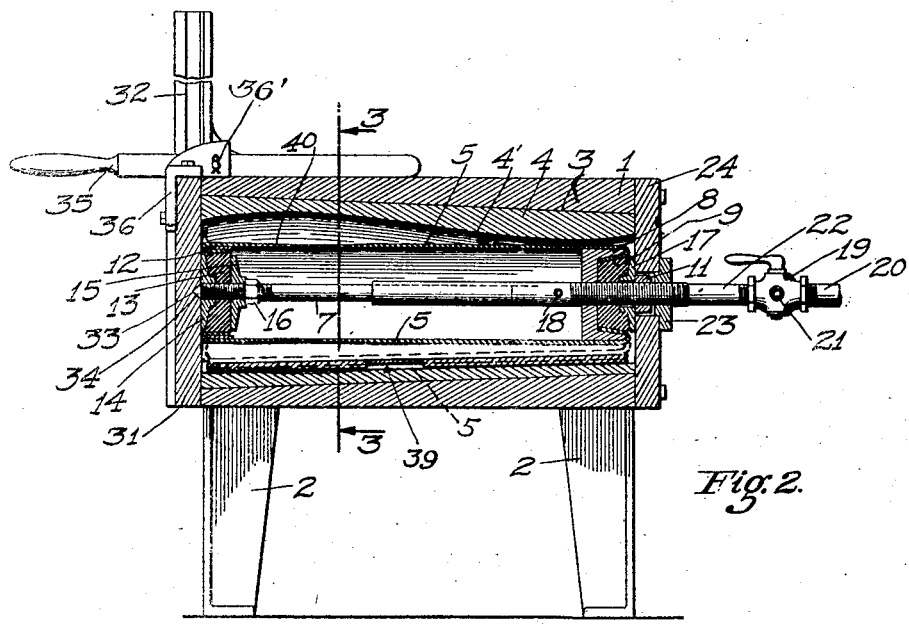
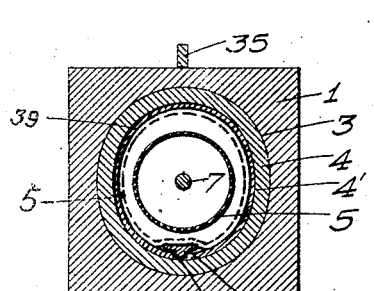
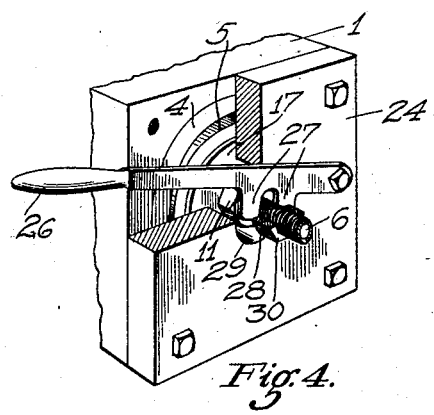
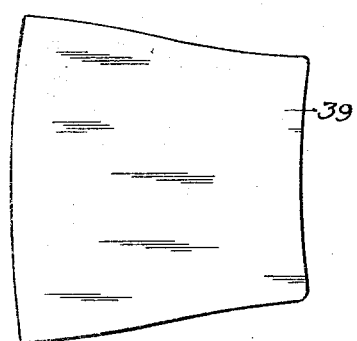

UNITED STATES PATENT OFFICE.

1,531,630

WILLIAM T. SUMMERS AND LOUIS B. GIRARD, OF LOS ANGELES, CALIFORNIA, ASSIGNORS TO SUMMERS MANUFACTURING COMPANY, OF LOS ANGELES, CALIFORNIA, A CORPORATION OF CALIFORNIA.

PROCESS AND APPARATUS FOR MOLDING LEATHER LEGGINGS.

Application filed February 7, 1922. Serial No. 534,687.

*To all whom it may concern:*

Be it known that we, WILLIAM T. SUMMERS and LOUIS B. GIRARD, citizens of the United States, residing at Los Angeles, in the county of Los Angeles and State of California, have invented a new and useful Process and Apparatus for Molding Leather Leggings, of which the following is a specification.

This invention relates to the manufacture of leather leggings or puttees, and the main object of the invention is to mold such leggings in the desired shape more economically than is possible with the methods now in use.

Another object of the invention is to enable the leather leggings to be molded to shape without preliminary seaming of same, thereby avoiding the expense of the labor and thread necessary for such seaming, and also avoiding the wastage of leather resulting from cutting away the seamed portion after molding. A further advantage of the invention in this connection is that the leather blanks used may be smaller than when seaming is resorted to, so that more or larger leggings may be made from a hide.

Another object of the invention is to mold the leather in such manner that the outer face of the leather is forced against a smooth or polished mold surface, giving a uniform burnished surface to the legging, and effecting this irrespective of any variations or defects in the leather blank.

The accompanying drawings illustrate an apparatus suitable for carrying out our invention, and referring thereto;

Fig. 1 is a perspective of the molding machine, partly broken away.

Fig. 2 is a longitudinal section of the machine.

Fig. 3 is a transverse section on line 3—3 in Fig. 2.

Fig. 4 is a perspective showing a preferred means for retaining the expanding bladder device in place.

Fig. 5 is a plan of a blank used in making a legging.

The molding machine shown in the drawings comprises a mold box 1, mounted on any suitable support such as legs 2, and formed with a longitudinal bore 3 in which is provided a lining 4 of babbitt or other suitable material, forming a tubular mold which is open at both ends, and whose internal surface 4' is shaped to conform to that of the finished legging. Within the mold cavity formed by this lining is provided an expanding means consisting of an elastic expansible hollow or tubular member formed as a tube or bladder 5, carried by an extensible mandrel which extends longitudinally in said cavity and is supported at each end, said mandrel having at one end a tubular portion 6 which is connected to a source of compressed air or other gas, so as to enable the bladder to be inflated. The other end of the mandrel is formed as a rod 7 sliding in said tubular portion and attached to the corresponding end of the bladder. The bladder 5 may consist of a substantially tubular body of soft rubber and may be fastened at its ends to the mandrel portions 6 and 7 in any suitable manner. For example, the mandrel portion 6 may have a flange 8 thereon provided with a tapering recess 9 to receive a tapering plug 10 of soft rubber, one end of the tubular bladder being extended over the flange 8 and turned back into the recess 9, and the plug being held tight within the portion so turned back by means of a washer 17 held by a clamp nut 11 screwing on mandrel portion 6. The further or front end of the tubular bladder 5 may extend over a ring 12 and then under said ring and between the ring and a circular washer 13 of soft rubber which is clamped between a disk 14 screwing on mandrel portion 7 and a follower plate 15 held in position by a nut 16 screwing on said mandrel portion. The bladder being first placed on the washer means 13 as stated and tightened by screwing up nut 16, is then drawn back over ring 12 and extended over flange 8 and into recess 9 and clamped therein by plug 10. The tubular mandrel portion 6 may have a vent 18 to permit passage of gas into or out of the bladder. A valve 19 is provided in the pipe 22 leading to the inlet of the bladder, said valve being a three way valve and having an inlet for compressed air or other expanding medium at 20 and an outlet to the outer air at 21, to permit escape of air or expanding medium from the bladder in deflating the same.

The bladder or expanding means may be mounted in the mold cavity as shown in Fig. 1, by means of a nut 23 screwing on mandrel portion 6 and engaging an end wall 24 of the mold box, said end wall being clamped between said nut and the washer 17 on the mandrel portion 6. In case quick removal of the expanding device is desired the construction shown in Fig. 4 may be adopted, comprising a lever 26 mounted on the wall member 24 and provided with wedge portions 27 adapted to engage between the wall and a nut 28 on the mandrel portion 6. On raising said lever, the mandrel portion 7 with the nut 28 thereon may be withdrawn through the opening 29 in said wall, said opening being larger than the nut 28, or its lock nut 30.

The means for supporting the front end of the expanding device comprises a plate or block 31 mounted to slide vertically in guides 32 at the front end of the mold box, and having a seat or recess 33 in which engages a nipple or center projection 34 on mandrel portion 7, when the bladder is extended. When the bladder is deflated it contracts longitudinally sufficiently to free the nipple 34 from seat 33 and the plate 31 may then be raised. To facilitate such raising of the end plate, a lever 35 may be provided, pivoted at 36' on a bracket 36 attached to the plate 31 adapted to engage the top of the mold box to lift the plate. When said lever is raised to upright position, its lower end is directly below or forward of the pivot of the lever so that the plate is locked in raised position.

A heater 37 is provided below the mold box to maintain the same in warm condition during the molding operation.

Our process may be carried out in the above described apparatus in the following manner: The leather blank, indicated at 39, cut to a shape about as shown in Fig. 5, is slightly moistened or dampened, preferably on the flesh side mainly or wholly, and is placed in the mold cavity, being bent so as to extend around the expanding device and with its edges at the bottom. The end plate 31 is then lowered so as to close the front end of the mold cavity and the compressed air is turned on at valve 19. The expansive effect of the air first extends the bladder device longitudinally, until the projection or nipple 34 of the extensible mandrel engages in seat 33. Further longitudinal extension of the bladder being thereby arrested, the bladder is dilated or inflated by continued admission of compressed air thereto, until it comes in contact with the leather blank and forces the same outwardly into close contact with the internal surface of the mold, as indicated in broken lines in Fig. 2. We have found that a pressure of about 200 pounds to the square inch applied for a period of about from one to ten minutes is sufficient to cause the leather to permanently conform to the shape of the mold and to take on a smooth uniform burnished finish on its grain or finished side, next the polished surface of the mold. The amount to which any particular part of the leather is pressed out or expanded is limited wholly by the mold, so that any weak or defective parts of the leather are pressed out only until they reach the mold surface, and leather blanks having such defects can, therefore, be used and will produce a legging in which the outer, visible, surface is just as perfect as if the leather blank were uniformly perfect.

In order to allow the leather of the blank to draw into parts of the mold which requires undue expansion of the leather, we prefer to provide for forcing such parts out into contact with the mold before the other parts of the blank are gripped, by the pressure of the bladder, against the mold. For this purpose the wall of the bladder may be made thinner at such part or parts, as indicated at 40 in Figs. 1 and 2, this thinner portion of the bladder expanding first and drawing the opposite part of the leather outwardly into the larger part of the mold and pinching such part against the mold, so as to anchor such part and ensure that there will be sufficient leather in this expanded part to provide the required form or shape.

In order to further facilitate the free movement of the leather to conform to the shape of the mold, we prefer to provide means for relieving the edges of the leather from the pressure of the expanding means, such relieving means comprising, for example, a bar 42 resting on the bottom of the mold and having taper edges or flanges 43 under which the edges of the leather extend so as to be relieved from the pressure of the expanding member 5. Or, by making all or part of the edges of said member 42 thicker they may be made to act as means for clamping all or part of the edges of the leather, in case such action is desirable.

What we claim is:

1. The method of forming leather leggings which consists in inserting within a tubular mold an unstretched and undeformed leather blank, and inflating a tubular elastic hollow expanding member within the leather blank so as to expand and stretch the leather blank into conformity with the internal surface of the mold, the edges of the leather blank being maintained free from pressure during such expanding operation to enable them to move during the expansion of the leather blank and thereby permit free movement of the leather to conform to the surface of the mold.

2. An apparatus for molding leather leggings, comprising a fixed tubular mold, a closure plate at the rear end of said mold, supporting means mounted on said closure plate and extending into said mold, an expansible tubular member extending within said mold and mounted on said supporting means, said supporting means also being provided with means for conducting expanding medium into said expansible member, a movable closure plate at the front end of said mold, and means for moving said closure plate to open position to permit insertion of a leather blank within said mold and for moving closure plate to closed position so as to close the end of the mold.

3. An apparatus as set forth in claim 2, in which said movable closure plate is provided with means adapted to engage the front end of said supporting means when in closed position, to assist in supporting the same.

4. An apparatus as set forth in claim 2, in which said supporting means for the expansible member comprises an extensible member adapted to be extended upon admission of expanding medium to said expansible member, said movable closure plate being provided with means adapted to engage the front end of said extensible member when said member is extended and when the movable closure plate is in closed position.

5. An apparatus for molding leather leggings comprising a tubular mold, an expansible tubular member extending within said mold, said mold being open at one end to permit insertion of a leather blank therein and around said expansible member, means for supporting said expansible member and for conducting and expanding medium thereinto to press said leather blank against said mold, and means within the mold and adapted to extend over the edges of the leather blank to relieve the pressure thereon.

6. An apparatus for molding leather leggings comprising a tubular mold provided with an internal molding surface of the same shape as the leggings to be molded, an expansible tubular member extending within said mold, said mold being open at one end to permit insertion of a leather blank therein and around said expansible member, means for supporting said expansible member and for conducting an expanding medium thereinto to press said leather blank against said mold, said internal molding surface being of such shape as to require greater expansion of the leather blank at certain portions thereof than at others, and said expansible member being so formed as to be most easily expanded at portions corresponding to the portions of the leather blank requiring the most expansion.

7. An apparatus for molding leather leggings comprising a hollow mold member open at its front end for the reception of the leather to be molded and an extensible mandrel extending into the hollow mold from the rear end thereof and mounted on a fixed supporting member at said rear end, means carried by said hollow mold member for supporting the front end of said expansible mandrel when same is extended, a hollow elastic expansible member carried by said extensible mandrel and means for conducting expanding medium into said hollow expansible member to cause extension of the mandrel and inflation of the hollow expansible mandrel.

8. An apparatus as set forth in claim 7 and comprising, in addition, valve means adapted for connection to a source of compressed air and provided with means for admitting such compressed air to the hollow expansible member and with means for shutting off such admission and for establishing communication between such hollow expansible member and the outer air to permit escape of air therefrom.

9. An apparatus as set forth in claim 7 and comprising in addition means within the mold and adapted to extend over the edges of the leather to be molded for controlling the pressure thereon.

In testimony whereof we have hereunto subscribed our names this 27th day of January, 1922.

WILLIAM T. SUMMERS.
LOUIS B. GIRARD.